US006642782B2

(12) United States Patent
Beigel et al.

(10) Patent No.: US 6,642,782 B2
(45) Date of Patent: *Nov. 4, 2003

(54) RECTIFYING CHARGE STORAGE ELEMENT

(76) Inventors: Michael L. Beigel, 308 Via Julita, Encinitas, CA (US) 92024; Yang Yang, 405 Hilgard Ave., 6531 Doelter Hall, Los Angeles, CA (US) 90095-1595

(*) Notice: Subject to any disclaimer, the term of this patent is extended or adjusted under 35 U.S.C. 154(b) by 0 days.

This patent is subject to a terminal disclaimer.

(21) Appl. No.: 10/155,518

(22) Filed: May 24, 2002

(65) Prior Publication Data

US 2002/0140500 A1 Oct. 3, 2002

Related U.S. Application Data

(63) Continuation of application No. 09/723,897, filed on Nov. 28, 2000, now Pat. No. 6,414,543.

(51) Int. Cl.[7] .............................................. H01L 25/00
(52) U.S. Cl. ........................................ 327/565; 327/565
(58) Field of Search ................................ 327/564, 565

(56) References Cited

U.S. PATENT DOCUMENTS

| 3,813,927 A | * | 6/1974 | Furgason ....................... 73/73 |
| 3,840,800 A | * | 10/1974 | Laupman ...................... 323/19 |
| 5,854,117 A | | 12/1998 | Huisman et al. ............. 438/379 |
| 6,037,718 A | | 3/2000 | Nagami ..................... 315/169.3 |
| 6,414,543 B1 | * | 7/2002 | Beigel et al. ................ 327/565 |

* cited by examiner

Primary Examiner—Kenneth B. Wells
(74) Attorney, Agent, or Firm—Kelly Bauersfeld Lowry & Kelley, LLP

(57) ABSTRACT

A power supply device consists of a rectifier and capacitor which share common elements facilitating the construction and application of the device to various types of substrates and, particularly, flexible substrates. Components of the device are fabricated from organic conductors.

18 Claims, 4 Drawing Sheets

RECTIFYING CHARGE STORAGE ELEMENT

This application is a continuation of Ser. No. 09/723,897, filed on Nov. 28, 2000, now U.S. Pat. No. 6,414,543.

This invention relates to a rectifying charge storage element and, more particularly, to electronic circuits fabricated on various substrates, including flexible substrates by various means including printing or other deposition techniques using organic conductors, semiconductors and insulators and other electronics material suitable for deposition and use in electronic circuits. The invention specifically relates to a power supply that extracts DC power (voltage and current) sufficient to power an electronic device from an AC input signal. The AC input signal may be derived from an inductive, capacitive, or L-C resonant circuit coupled to an external electromagnetic or electrostatic AC field. The electronic circuit thus powered may be an RFID circuit.

BACKGROUND OF THE INVENTION

Most electronic circuits require a source of DC voltage with sufficient current output to power the circuit elements. Many of these circuits derive DC power by rectifying and filtering an AC power signal. Often the AC signal is provided to the circuitry by electromagnetic coupling.

For example, a passive RFID tag system must be capable of receiving power from an RFID reader to the RFID tag via inductive (H-field) or electric field (E-field) coupling, and transmitting data from the tag to the reader also via inductive or electric field coupling. Activation field frequency of RFID devices may be from under 100 kHz up to over 30 MHz if inductive or capacitive coupling to the activation source is utilized or up to multiple GHz if electric field coupling is utilized.

In current industry practice, operating power to a passive tag or other electronic circuit is derived by utilizing a rectifier device and a charge-storage device typically a rectifier diode or combination of diodes connected to a charge storage capacitor or combination of capacitors. Typically these elements are implemented as separate components within a discrete circuit or silicon integrated circuit.

New technology is developing for manufacturing circuitry such as RFID tags on flexible substrates using thin film materials such as polymer semiconductors and other substances that can be applied by techniques such as ink jet printing. A primary objective is producing devices that have operating characteristics competitive with silicon technology while approaching the economy of printing processes.

Beigel U.S. Pat. No. 4,333,072 describes an inductively coupled RFID system in which power to an RFID tag is derived from an alternating magnetic field originating in a reader-energizer coupled inductively to the tag antenna, and rectified by a rectifier in the antenna with the resulting DC charge stored in a capacitor in the tag.

Beigel, U.S. Pat. No. 5,973,598 describes an RFID tag formed on a flexible substrate by depositing or printing conductive, semiconductive and insulating substances in an operative pattern on the substrate.

U.S. Pat. No. 6,087,196 (Sturm et al) describes the fabrication of electronic circuits on flexible substrates by ink jet printing methods. U.S. Pat. No. 6,037,718 describes an organic transistor stacked on an electroluminescent display element. U.S. Pat. No. 5,915,197 describes a "varicap" diode formed by silicon processes.

OBJECTS AND ADVANTAGES OF THE INVENTION

An object of the invention is the provision of a composite device that provides rectification and charge storage for converting AC signals to DC power supply voltages by structurally combining a rectifier diode and charge storage capacitor.

An additional object of the invention is the provision of a composite power supply which incorporates a diode rectifier and a capacitor, said rectifier and capacitor sharing a common component to facilitate the provision of the diode and rectifier in a single device.

Another object of the invention is the provision of a device of the aforementioned character which can be provided on a flexible substrate to facilitate the incorporation of the device in correspondingly flexible environments.

A further object of the invention is the provision of a device of the aforementioned character wherein various components of the device may be fabricated from organic and other conductors which constitute the interface between the conductors of the rectifier and capacitor components of the device.

Additionally, the device may incorporate a flexible substrate as an electrically operative component of the device.

BRIEF DESCRIPTION OF THE DRAWINGS

Other objects and advantages of the invention will become apparent from the following specification and the accompanying drawings in which.

PREFERRED EMBODIMENTS OF THE INVENTION

Figure 1:
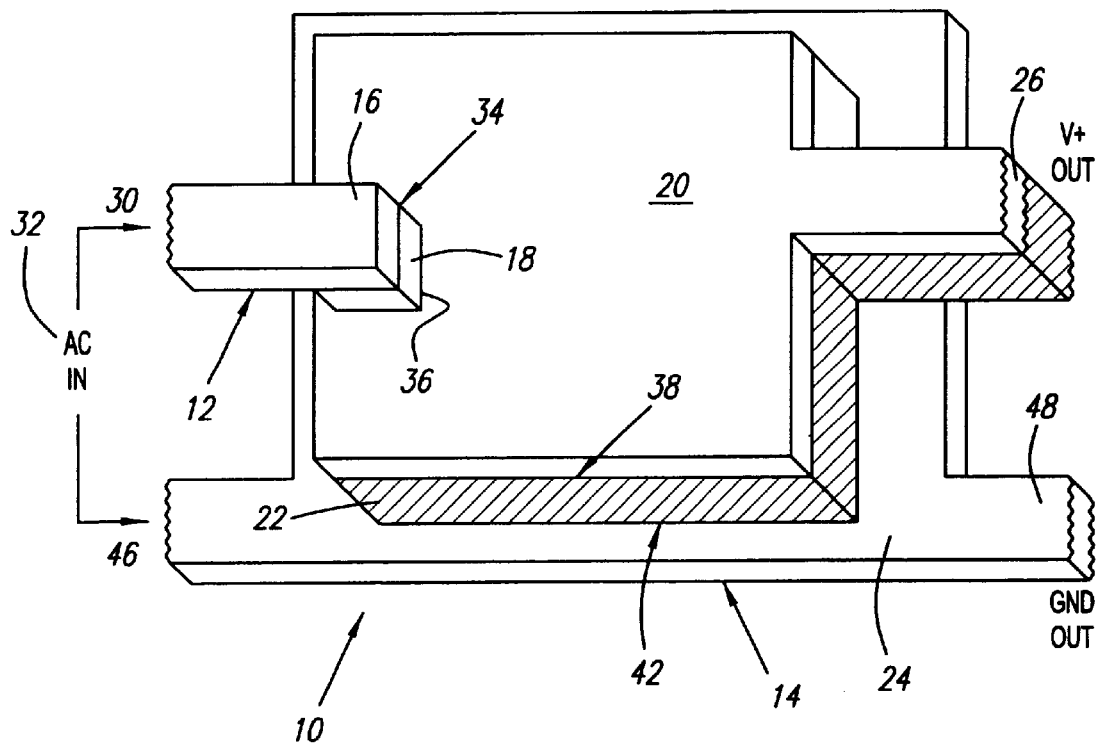
FIG. 1 shows a device constructed in accordance with the teachings of the invention.

Referring to the drawings and particularly to FIG. 1 thereof, I show a power supply device 10 including a diode rectifier 12 and a capacitor 14. The diode 12 includes a conductor 16 and a semiconductor 18. A common conductor 20 between the diode 12 and capacitor 14 is superimposed on a dielectric component 22 of the capacitor 14 which, in turn, is mounted on a conductor 24.

The conductor 16 is electrically connected to one terminal 30 of the AC source 32 and electrically connected to one surface of the semiconductor 18 at the surface interface 34. The opposite surface of the semiconductor 18 is electrically connected to the common conductor 20 at the surface interface 36.

The common conductor 20 is connected to the dielectric component 22 at surface interface 38 and the conductor 24 is connected to the dielectric component 22 at the surface interface 42. The conductor 24 is connected to the other terminal 46 of the AC source 32 and also serves as the ground output terminal 48. Rectification takes place between the conductor 16, the semiconductor 18, and the common conductor 20 through the interfaces 34 and 36. Charge storage takes place between the common conductor 20, the dielectric component 22, and the conductor 24. The surface area of the rectifying component and 16, 34, 18, 36, and 20 interfaces is preferably minimized to reduce internal parasitic capacitor characteristics inherent in rectification. The surface area of the capacitive component interface provided by the common conductor 20 may be maximized to increase DC charge storage.

The common conductor 20 provides the DC power at the junction 26 and the circuit being powered by the device 10 may be energized thereby inductively, magnetically, or directly.

The diode components may be fabricated from various materials, including inorganic semiconductor nanocrystals such as CdSe, InP, and others.

Furthermore, conjugated polymers may be used, such as poly(phenylene-vinylene)(PPV), its derivatives and co-poloymers; polyfluorene (PF), its derivatives and co-polymers; polyparaphenylene (PPP), its derivatives and co-polymers; polythiophene (PT), its derivatives and co-polymers; and others.

The rectifying function of the diode 12 is implemented through the conductor 16 which serves as the anode and the common conductor 20 which serves as the cathode. The rectifying character of an organic or a polymeric diode usually requires different conductors for the anode and for the cathode. Organic and polymeric semiconductors are usually regarded as semiconductors with low doping concentration (usually in the range of ~$10^{13}$ cm$^{-3}$), hence the theory of p-n junction commonly used in inorganic semiconductor diodes is not applicable here. For inorganic diodes, metal electrodes for the anode and the cathode can be the same material with ohmic contacts to the p-type and n-type semiconductor, respectively. The rectifying behavior is from the p-n junction.

For organic semiconductors, the relative position of the work functions (or the energy level) of the metal electrodes to the energy levels of the conduction band and valence band of the organic semiconductor determines the rectifying behavior. The choice of anode hence is preferentially to be high work function metals such as gold, nickel, and their alloys. Alternatively, some metal oxides, including but not limited to indium tin-oxide, indium oxide, are also candidates for the anode material.

For the cathode, the choice is preferentially low work function metals, including but not limited to calcium, lithium, magnesium, and others. Recently, the metal alloys consisting of a small amount of low work function metals, such as aluminum:lithium 3% alloy and 97% A: LiF bilayer electrode, have become alternatives for the choice of cathode material.

The materials for the capacitor dielectric 22 should be insulating materials, preferentially with a high dielectric constant to enhance its capacity. The structure of the capacitor 14 should provide a larger area compared to the diode. The dielectric 22 may be an organic and polymeric or inorganic insulator with reasonable dielectric constant. It should be large enough to hold enough charge, and it should also be small enough such that the device 10 has a fast response time. Currently, polymer materials such as polystyrene, polyethylene, and polycarbonate are ideal candidates. The dielectric 22 should be flexible where the other components of the device 10 are flexible.

The device 10 may be fabricated according to traditional polymer and organic device fabrication processes. Polymer and organic thin films can be processed by spin-coating, ink-jet printing, roll-to-roll coating, and other coating methods. Organic thin films can also be deposited by thermal sublimation, chemical vapor deposition, an analogous methods. Metal electrodes can be deposited on a substrate by thermal deposition under high vacuum or by the ink-jet printing process.

Where conventional materials are utilized, the components of the device 10 can be assembled by the use of materials and processes well known to those skilled in the art.

Figure 2:
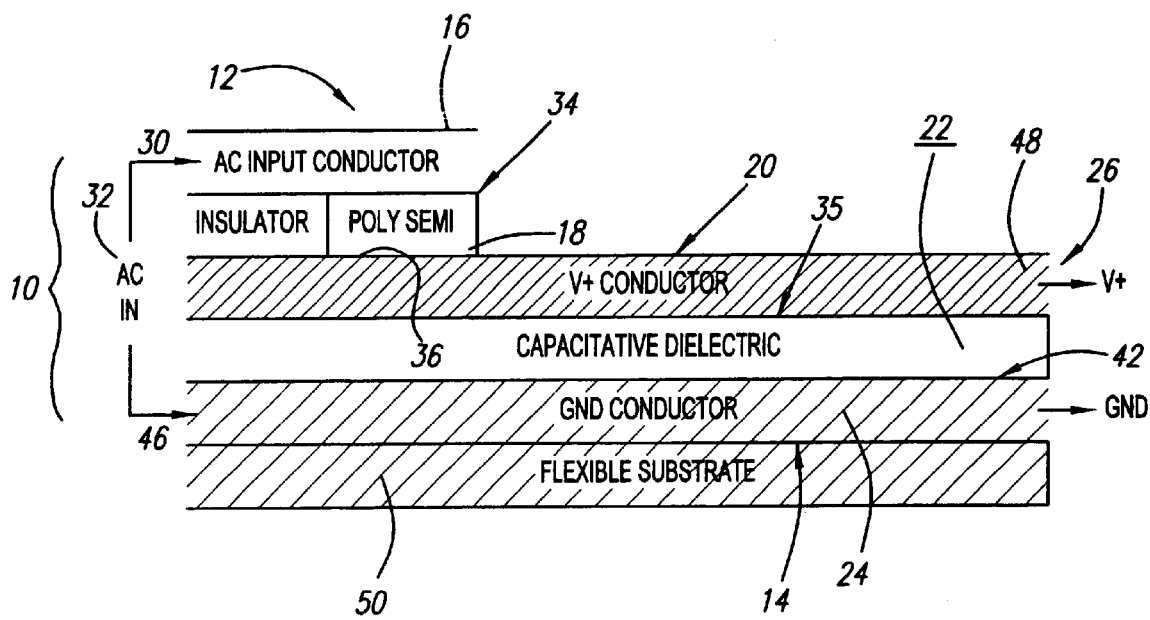
FIG. 2 is a sectional view showing the device mounted on a flexible substrate.

The device 10 of FIG. 1 is shown in FIG. 2 as mounted on a flexible substrate 50 with all of the other components of the device 10 bearing the same reference numerals as the device 10 of FIG. 1.

Figure 3:
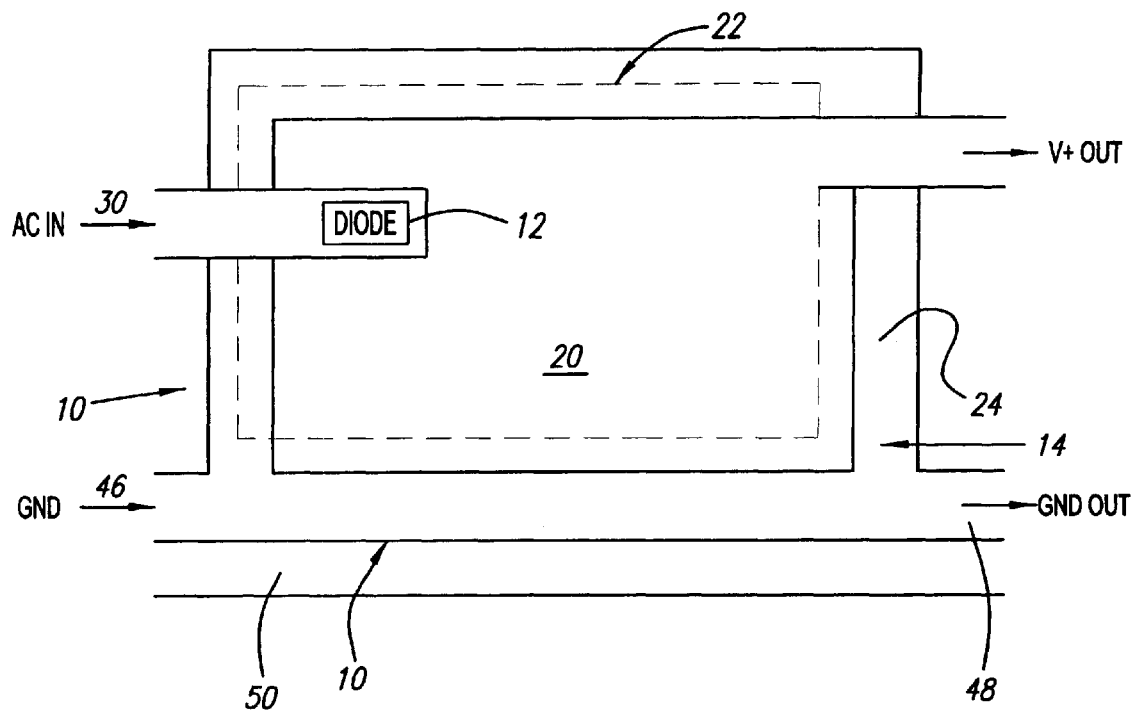
FIG. 3 is a plan view of the device of FIG. 2.

FIG. 3 is a top plan view of the device 10 of FIG. 2 and shows the device 10 superimposed on the top surface of a flexible substrate 50. The flexible substrate 50 may be manufactured from any type of material. Where a flexible substrate, such as the substrate 50, is provided, it is desirable that all of the components of the device 10 be correspondingly flexible so that the device 10 may be mounted, through the flexible substrate 50, in environments where such flexibility is indicated. Typical substrates are sheets or strips of polyethylene, polyvinylchloride, or the like.

Figure 4:
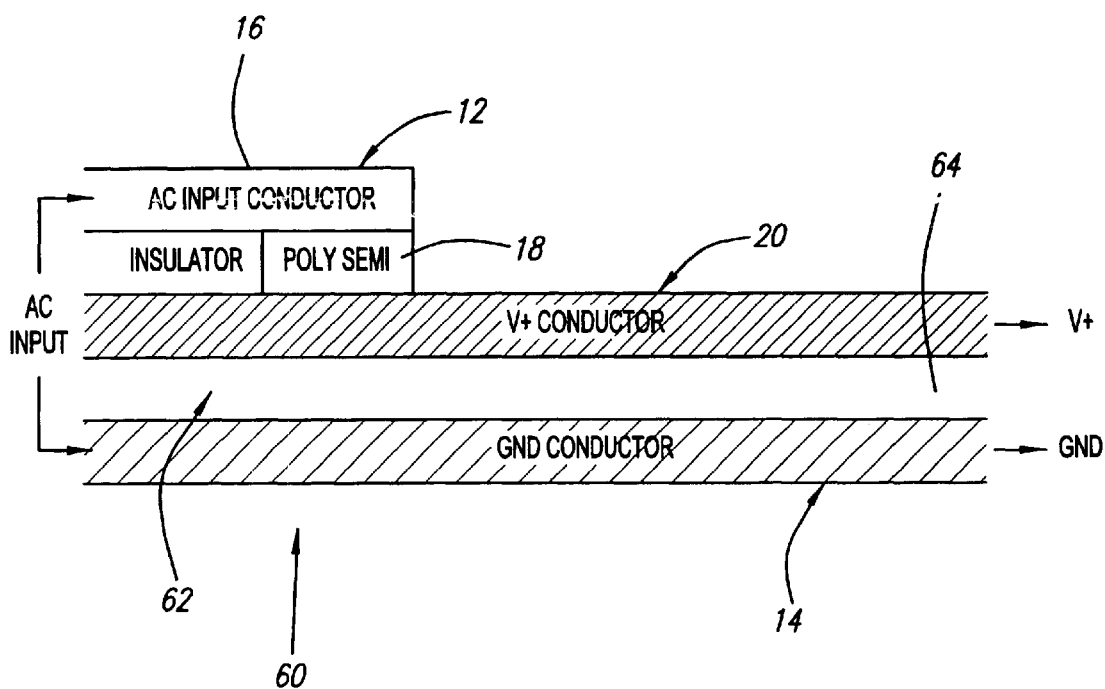
FIG. 4 is a sectional view showing the incorporation in the device of a flexible substrate.

An alternative embodiment 60 of the device 10 is shown in FIG. 4 in cross section and includes elements identical with or similar to the corresponding elements of FIGS. 1–3, said elements being provided with the same reference numerals as those of FIGS. 1–3.

The major difference between the device 60 of FIG. 4 and the device 10 lies in the provision of a dielectric 62 which is incorporated in a flexible substrate 64. Once again, the flexible substrate can be manufactured from strip or sheet plastic material such as polyvinylchloride, polystyrene, polyethylene, and the like.

Figure 5:
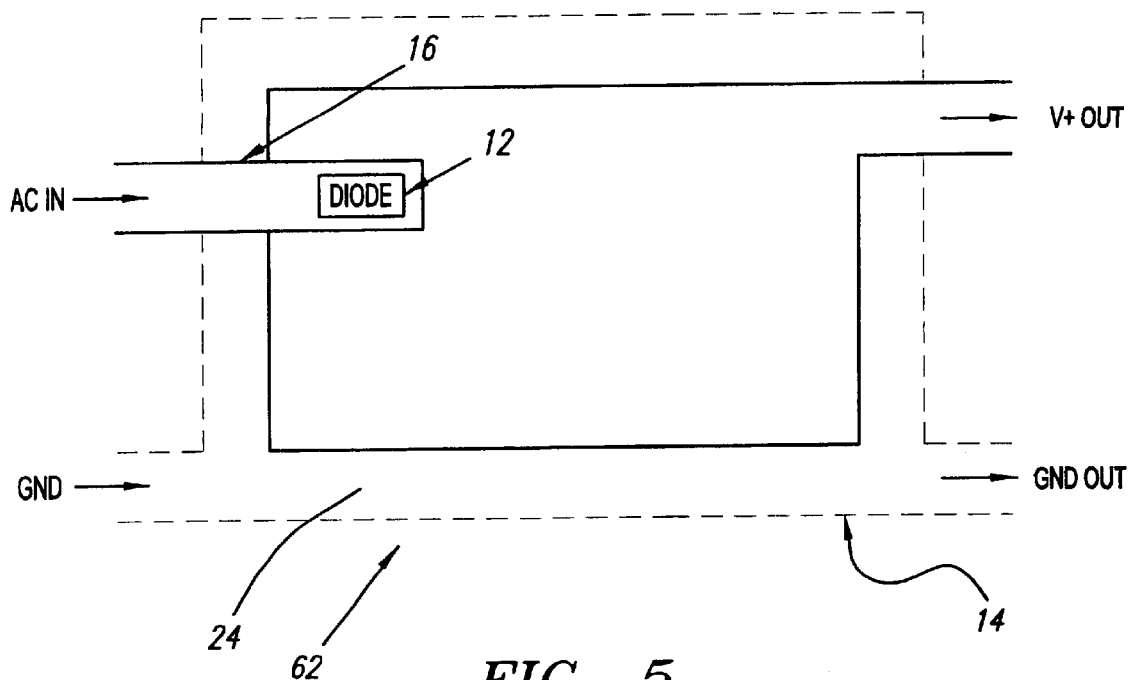
FIG. 5 is top plan view of the device of FIG. 4.

The device of FIG. 4 is shown in plan in FIG. 5. Although the flexible substrate 62 is shown as protruding beyond the limits of the remaining elements of the device 60, it is not intended that the actual commercial device be limited to that particular configuration since it is contemplated that the devices be extremely miniaturized.

Figure 6:
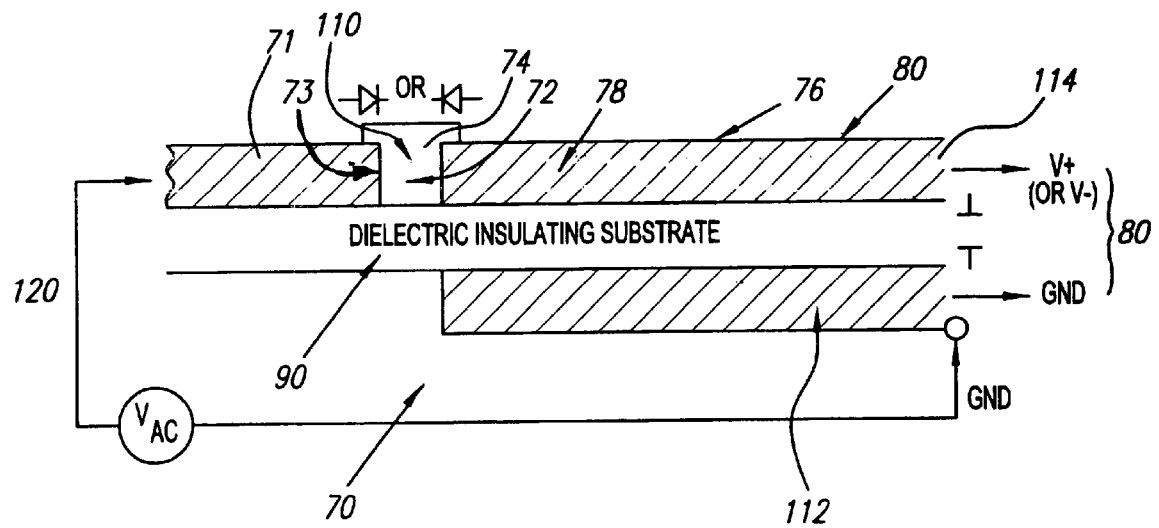
FIG. 6 is a view of an alternative embodiment of the device of the invention.

An alternative embodiment 70 of the power supply device 10 is shown in FIG. 6 and functions in the same manner as the devices of FIGS. 1–5. However, the various elements of the embodiment 70 are disposed in a planar rather than a superimposed relationship which is characteristic of the previously discussed embodiments of FIGS. 1–5.

The planar relationship of the various components minimizes the rectifier capacitance of the diode and also provides for various advantages in device fabrication. The device 70 incorporates a conductive layer 71 having a low work function and terminating to create a gap 72. The conductive layer 71 forms the anode terminal 73 of the rectifying diode 74.

A common conductive layer 76 having a high work function and larger surface area than the first conductive layer 71 is provided at the gap 72 and constitutes the cathode of the diode 74 as well as the top layer 78 of the capacitor 80.

A dielectric substrate 90 is provided below the conductors 71 and 76 and an organic or other molecular semiconductor 110 is provided in the gap 72 to establish a current path across the gap and permit the performance of the rectifier function of the device 70.

A conductive layer 112 underlies the dielectric substrate 90 and the completion of the capacitor 70 is accomplished.

An AC circuit 120 is connected at one side to the conductive layer 71 and at the opposite side to the layer 112 which acts as the ground of the circuit. The DC output is located at 114 on the layer 76.

The planar structure of the device 70 permits the formation of a power supply of opposite polarity by using opposite combinations of high and low work function conductors such as the layers 71 and 76.

Figure 7:
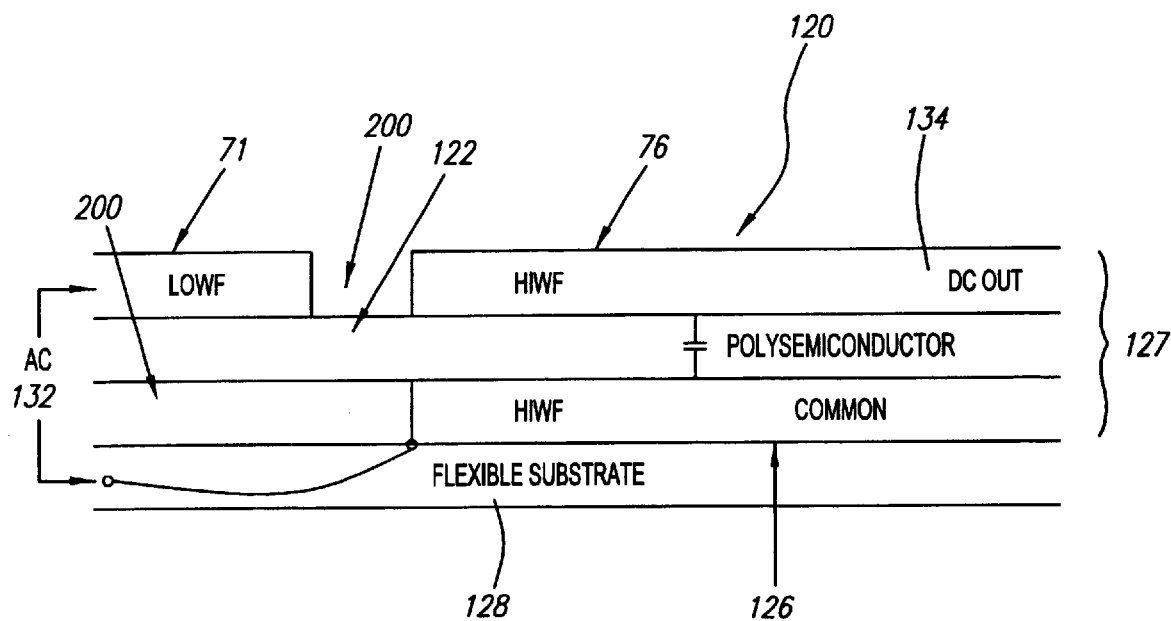
FIG. 7 is a sectional view of another embodiment of the invention.

A planar device 120 is shown in FIG. 7 as including the layers 71 and 76 of the device 70 of FIG. 6. However, instead of incorporating the flexible dielectric 110 of the device 70, a common layer 122 is provided which serves as a semiconductor connection to the common layer 76 and as a dielectric between the common layers 76 and the layer 126 of a capacitor 127.

Therefore, there are two elements of the device 120 serving a common function, namely, the semiconductor/dielectric layer 122 and the common conductive layer 76. The layer 126 is a high work function layer and serves as the ground for the circuit of the device 120. The provision of the coplanar layers 71 and 76 and the common performance of the layer 76 and the layer 122 greatly simplify the fabrication of the device 120 on the flexible substrate 128.

The AC input 132 is connected on one side to the anode layer 71 and on the other side to the common conductor layer 76 with the DC output being connected to the layer 76 at 134.

Figure 8:
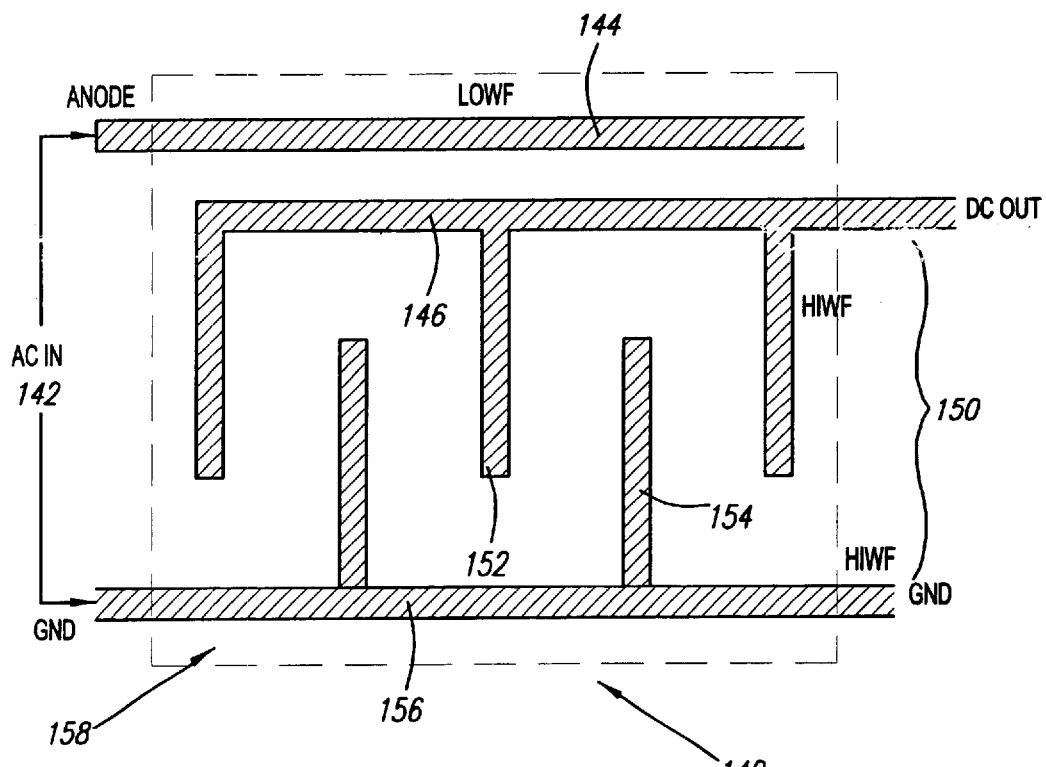
FIG. 8 is a schematic view, in plan, of yet another embodiment of the invention.

An alternative embodiment 140 of the device is shown in FIG. 8 of the drawings as including an AC input at 142 which is connected to an anode 144. The anode 144 communicates with one side 146 of an interdigitate capacitor unit 150. The interdigitate capacitor layers or fingers 152 of said one side fit between corresponding layers or fingers 154 of the other side 156. The entire assemblage is encapsulated or overlaid by semiconductor/dielectric material 158 to create the rectification and capacitance effects. The device 150 is particularly suited to deposition on a flexible substrate and is susceptible to various well-established methods of deposition conductors such as conductive inks, organic polymers, or the like.

We claim:

1. In a power supply, the combination of:
    a rectifier;
    a common conductor connected to one side of said rectifier; and
    a capacitor incorporating said common conductor whereby it receives rectified current from said capacitor;
    said rectifier, common conductor and capacitor comprising a unitary rectifying charge storage element.

2. The power supply of claim 1 in which said rectifier incorporates diode elements and said common conductor is one of said diode elements.

3. The power supply of claim 1 in which said common conductor is the primary conductor for said capacitor.

4. The power supply of claim 1 in which said rectifier is a diode-type rectifier and said common conductor is the output of said rectifier and the input of said capacitor.

5. The power supply of claim 1 in which said rectifier is a diode-type rectifier an incorporates an organic semiconductor and said common conductor is connected to said semiconductor.

6. In a power supply, the combination of:
    a rectifier, said rectifier having an anode and a semiconductor connected to said anode;
    a common conductor connected to said semiconductor;
    a capacitor incorporating said common conductor on one side, said capacitor having a dielectric component; and
    a conductor on the other side of said dielectric component;
    said rectifier, common conductor and capacitor comprising a unitary rectifying charge storage element.

7. The power supply of claim 6 which incorporates a flexible substrate supporting the components of said power supply.

8. The power supply of claim 6 in which said semiconductor is an organic conductor and said organic conductor communicates with said common conductor.

9. The power supply of claim 6 in which said dielectric component is an organic dielectric.

10. The power supply of claim 6 in which said power supply is supported on a flexible substrate and said rectifier and capacitor are imprinted on said flexible substrate.

11. In a power supply, the combination of:
    a rectifier having an input anode;
    a semiconductor component connected to said anode;
    a common conductor disposed in electrical communication below said semiconductor;
    a dielectric component disposed below said common conductor; and
    another conductor in electrical communication with said dielectric component and having said dielectric component superimposed thereupon to provide a capacitor, said anode and said common conductor being electrically connected to the source of rectifiable current and said common conductor providing the output of said power supply;
    said rectifier, common conductor and capacitor comprising a unitary rectifying charge storage element.

12. The power supply of claim 11 in which said semiconductor component is fabricated from an organic conductor.

13. The power supply of claim 11 in which said dielectric component is fabricated from an organic material.

14. The power supply of claim 11 in which said semiconductor and said dielectric component are fabricated from organic materials.

15. The power supply of claim 11 in which the components of said power supply are supported on a flexible substrate.

16. The power supply of claim 15 in which said components are imprinted on said flexible substrate.

17. The power supply of claim 11 in which said rectifier and said capacitor are supported by a flexible substrate.

18. The power supply of claim 17 in which the flexible substrate is the dielectric component.

* * * * *